(12) United States Patent
Zhao

(10) Patent No.: US 7,668,173 B2
(45) Date of Patent: Feb. 23, 2010

(54) METHOD AND SYSTEM FOR AN ADAPTIVE WIRELESS ROUTING PROTOCOL IN A MESH NETWORK

(75) Inventor: Fuyong Zhao, San Jose, CA (US)

(73) Assignee: Azalea Networks, Grand Cayman (KY)

( * ) Notice: Subject to any disclaimer, the term of this patent is extended or adjusted under 35 U.S.C. 154(b) by 524 days.

(21) Appl. No.: 11/291,747

(22) Filed: Dec. 1, 2005

(65) Prior Publication Data

US 2007/0127503 A1 Jun. 7, 2007

(51) Int. Cl.
*H04L 12/28* (2006.01)
(52) U.S. Cl. .................. 370/395.21; 370/406
(58) Field of Classification Search ............ 370/395.31, 370/238, 237, 331, 395.21, 406, 351, 400, 370/216, 236; 455/432.1; 709/238
See application file for complete search history.

(56) References Cited

U.S. PATENT DOCUMENTS

| | | | | |
|---|---|---|---|---|
| 6,044,075 A * | 3/2000 | Le Boudec et al. | ........... | 370/351 |
| 6,363,319 B1 * | 3/2002 | Hsu | ........... | 701/202 |
| 6,385,201 B1 * | 5/2002 | Iwata | ........... | 370/400 |
| 6,687,653 B1 * | 2/2004 | Kurien et al. | ........... | 702/183 |
| 6,829,221 B1 * | 12/2004 | Winckles et al. | ........... | 370/238 |
| 7,068,624 B1 * | 6/2006 | Dantu et al. | ........... | 370/331 |
| 7,362,709 B1 * | 4/2008 | Hui et al. | ........... | 370/237 |
| 7,382,731 B1 * | 6/2008 | Zhao et al. | ........... | 370/236 |
| 7,415,278 B2 * | 8/2008 | Zhao et al. | ........... | 455/447 |
| 7,466,655 B1 * | 12/2008 | Zhao | ........... | 370/238 |
| 7,561,526 B2 * | 7/2009 | Naden et al. | ........... | 370/238 |
| 2003/0088529 A1 * | 5/2003 | Klinker et al. | ........... | 706/3 |
| 2004/0114569 A1 * | 6/2004 | Naden et al. | ........... | 370/351 |
| 2004/0190454 A1 * | 9/2004 | Higasiyama | ........... | 370/238 |
| 2005/0074015 A1 | 4/2005 | Chari et al. | | |
| 2005/0138200 A1 * | 6/2005 | Liu et al. | ........... | 709/238 |
| 2006/0045004 A1 * | 3/2006 | Charzinski et al. | ........... | 370/216 |
| 2006/0056328 A1 * | 3/2006 | Lehane et al. | ........... | 370/315 |
| 2007/0265000 A1 * | 11/2007 | Hanson et al. | ........... | 455/432.1 |
| 2008/0162723 A1 * | 7/2008 | Zhao et al. | ........... | 709/242 |

FOREIGN PATENT DOCUMENTS

| | | | | |
|---|---|---|---|---|
| WO | PCT/GB2003/003308 | * | 7/2002 | |
| WO | WO03/049340 A2 | * | 6/2003 | |
| WO | WO03/049341 A1 | * | 6/2003 | |
| WO | WO03/049342 A2 | * | 6/2003 | |

OTHER PUBLICATIONS

Performance of urban mesh networks; V Sridhara, J Kim, S Bohacek—Proceedings of the 8th ACM international symposium 2005.*

(Continued)

*Primary Examiner*—Salman Ahmed
(74) *Attorney, Agent, or Firm*—Orrick, Herrington & Sutcliffe LLP

(57) ABSTRACT

A method and system for an adaptive wireless routing protocol in a mesh network are disclosed. In one embodiment, the method comprises routing datagrams between a plurality of nodes in a mesh network. Update messages are routed to one or more of the plurality of nodes, wherein the update messages include hello packets and update packets.

24 Claims, 11 Drawing Sheets

OTHER PUBLICATIONS

Reliability constrained routing in QoS networks; Chakrabarti, A.; Manimaran, G.; Networking, IEEE/ACM Transactions on vol. 13, Issue 3, Jun. 2005 pp. 662-675.*

On-Line Routing in WDM-TDM Switched Optical Mesh Networks; Vishwanath, A.; Weifa Liang; Parallel and Distributed Computing, Applications and Technologies, 2005. PDCAT 2005. Sixth International Conference on Dec. 5-8, 2005 pp. 215-219.*

Constraint-based routing across multi-domain optical WDM networks; Saad, T.; Mouftah, H.T.; Nouroozifar, A.; Electrical and Computer Engineering, 2004. Canadian Conference on vol. 4, May 2-5, 2004 pp. 2065-2068 vol. 4.*

RFC: 2328; OSPF Version 2, Apr. 1998.*

International Search Report dated Nov. 1, 2007.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                  Destination IP address                610    |
+-+-+-+-+-+-+-+-+-+-+-+-+-+-+-+-+-+-+-+-+-+-+-+-+-+-+-+-+-+-+-+-+
|                 Destination network mask               620    |
+-+-+-+-+-+-+-+-+-+-+-+-+-+-+-+-+-+-+-+-+-+-+-+-+-+-+-+-+-+-+-+-+
|                   Destination Router ID                630    |
+-+-+-+-+-+-+-+-+-+-+-+-+-+-+-+-+-+-+-+-+-+-+-+-+-+-+-+-+-+-+-+-+
|                Destination sequence number             640    |
+-+-+-+-+-+-+-+-+-+-+-+-+-+-+-+-+-+-+-+-+-+-+-+-+-+-+-+-+-+-+-+-+
|                          Metric                        650    |
+-+-+-+-+-+-+-+-+-+-+-+-+-+-+-+-+-+-+-+-+-+-+-+-+-+-+-+-+-+-+-+-+
```

FIG. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                   Destination Router ID                710    |
+-+-+-+-+-+-+-+-+-+-+-+-+-+-+-+-+-+-+-+-+-+-+-+-+-+-+-+-+-+-+-+-+
|                Destination sequence number             720    |
+-+-+-+-+-+-+-+-+-+-+-+-+-+-+-+-+-+-+-+-+-+-+-+-+-+-+-+-+-+-+-+-+
|                         Next hop                       730    |
+-+-+-+-+-+-+-+-+-+-+-+-+-+-+-+-+-+-+-+-+-+-+-+-+-+-+-+-+-+-+-+-+
|                          Metric                        740    |
+-+-+-+-+-+-+-+-+-+-+-+-+-+-+-+-+-+-+-+-+-+-+-+-+-+-+-+-+-+-+-+-+
```

FIG. 7

| 810 | 820 | 830 | 840 | 850 | 860 | 870 | 880 |
|---|---|---|---|---|---|---|---|
| Destination IP Address | Destination Mask | Router ID of Destination Node | Highest Sequence # Route | Least Metric Route | Immediate Update Flag | Need Advertise Flag | Messenger Info |

890

FIG. 8

METHOD AND SYSTEM FOR AN ADAPTIVE WIRELESS ROUTING PROTOCOL IN A MESH NETWORK

FIELD OF THE INVENTION

The field of the invention relates generally to wireless networks and more particularly relates to a method and system for an adaptive routing protocol tailored for wireless mesh networks.

BACKGROUND

With recent technological advancements in computer and wireless communications, mobile wireless computing has seen increasingly widespread use and application. Not constrained by wires, users with mobile computing devices can move around freely at their convenience, and may often need to communicate with each other in circumstances where there is no fixed infrastructure. In such cases, they can form a Mobile Ad hoc network (MANET) or mobile wireless mesh network. A mobile wireless mesh network is an autonomous system of wireless mobile routers (and associated hosts), which can move randomly and re-organize themselves into an arbitrary network without any underlying backbone and infrastructure.

Besides mobile wireless mesh networks, recently, interesting commercial applications of fixed wireless mesh networks have also emerged. One example of such applications is "community wireless networks," which are used to provide broadband Internet access to communities that previously did not have such access. In these fixed "community wireless networks", Each wireless router in the network not only provides Internet access for attached users but also becomes part of the network infrastructure and can route data through the wireless mesh network to its destination. A routed wireless mesh network is highly flexible and inherently fault-tolerant. It simplifies line-of-sight problems and extends the reach and coverage of the network with a minimal amount of network infrastructure and interconnection costs.

There are also hybrid wireless mesh networks where some mesh routers are mobile and the others are not. In whatever cases (whether mobile or fixed or hybrid), wireless mesh networks have some salient characteristics, such as: highly dynamic, autonomous, peer-to-peer, multi-hop, often limited bandwidth and computing power etc. The wireless mesh networks are highly dynamic for two reasons: First, the routers themselves may move (e.g. in mobile or hybrid wireless mesh networks), causing fast topological changes. Second, even if the routers themselves don't move (e.g. in fixed wireless mesh networks), the radio link qualities can change very quickly because of interference, geographical and environmental factors etc. The traditional routing protocols (e.g. OSPF, RIP), designed for wired infrastructures, can not handle such fast changes. Many of the ad hoc routing protocols (e.g. AODV), on the other hand, lack the ability to flexibly adapt to the radio link quality changes.

SUMMARY

A method and system for an adaptive wireless routing protocol in a mesh network. are disclosed. In one embodiment, the method comprises routing datagrams between a plurality of nodes in a mesh network. Routing messages are sent to one or more of the plurality of nodes, wherein the routing messages include hello packets and update packets.

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

FIG. 6 illustrates a diagram of the format of a distance section entry, according to one embodiment of the present invention;

FIG. 7 illustrates a diagram of the format of a messenger section entry, according to one embodiment of the present invention;

FIG. 8 illustrates a diagram of an exemplary routing table, according to one embodiment of the present invention;

DETAILED DESCRIPTION

Figure 1:
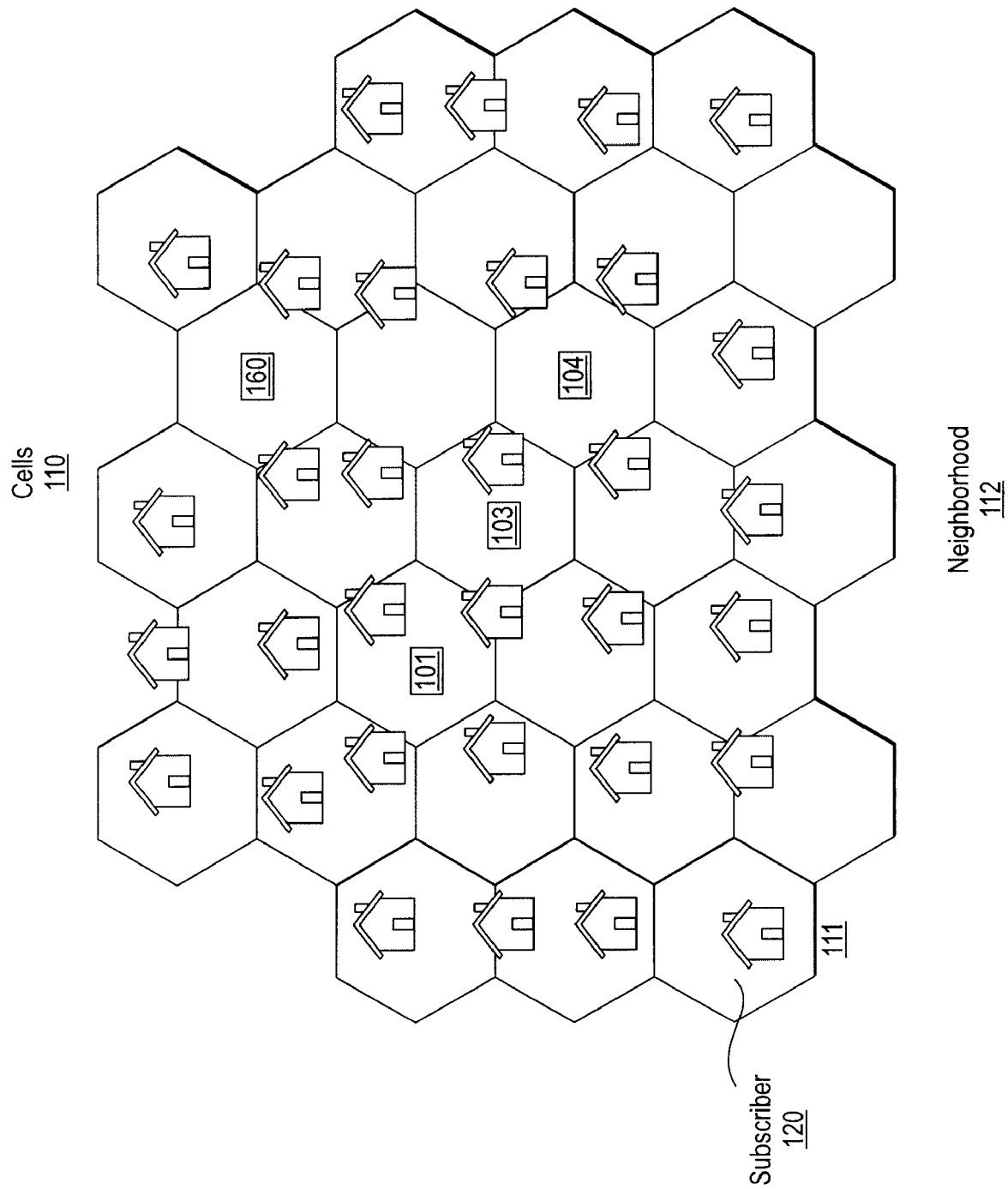
FIG. 1 illustrates a block diagram of an exemplary wireless mesh network, according to one embodiment of the present invention.

A method and system for an adaptive wireless routing protocol in a mesh network are disclosed. In one embodiment, the method comprises routing datagrams between a plurality of nodes in a mesh network. Routing messages are sent to one or more of the plurality of nodes, wherein the routing messages include hello packets and update packets.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of wireless networks and computer systems. These wireless network descriptions and representations are the means used by those skilled in the wireless networking arts to most effectively convey the substance of their work to others skilled in the art. A wireless network is here, and generally, conceived to be a system for communications among two or more computers using radio waves as its carrier. Usually, though not necessarily, the information communicated between computer systems takes the form of packets. Furthermore, for reasons of common usage, the components of the packets are referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "router" or "radio" or "frequency" or "channel" or "backbone" or "packet" or "communicate" or the like, refer to the components, and actions and processes of a network, or similar communication system, that transfers data represented as physical (electronic) quantities within the computer system's registers and memories or other such information storage, transmission or display device from one computer system to another.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The following list describes acronyms and definitions for terms used herein:

node: A router which implements adaptive wireless routing, according to the method and system described herein;

adaptive wireless routing interface: A network device participating in a wireless mesh running adaptive wireless routing. A node may have several adaptive wireless routing interfaces.

non adaptive wireless routing interface: A network device not participating in a wireless mesh running adaptive wireless routing. A node may have several adaptive wireless routing interfaces. Routing information from these interfaces may be injected into the adaptive wireless routing domain.

router ID: A 32-bit number that uniquely identifies a node in the wireless mesh network. One possible implementation strategy would be to use the smallest IP address of the adaptive wireless routing interfaces belonging to the node. Another possible implementation strategy would be to use the IP address of the loop-back interface configured for this purpose.

destination sequence number: A monotonically increasing number originated and maintained by each destination node. This helps on identifying the stale routes from the new ones, thus avoiding loop.

link: A link is a pair of adaptive wireless routing interfaces (from two different nodes) susceptible to hear one another (i.e., one may be able to receive traffic from the other). A node is said to have a link to another node when one of its interfaces has a link to one of the interfaces of the other node.

The present method and system for adaptive wireless routing includes an adaptive, distributed, proactive routing protocol designed for wireless mesh networks. FIG. 1 illustrates a block diagram of an exemplary wireless mesh network, according to one embodiment of the present invention. Mesh network 100 may be part of a wireless network, such as neighborhood 112. According to one embodiment, the neighborhood 112 is divided into a number of cells 110, where each individual cell 111 includes one or more subscribers 120 to the wireless mesh network 100. The division of the neighborhood 112 is a logical division, and the physical boundaries between cells in network 100 are only representations of the logical network operation. A cell 111 may or may not encompass a subscriber 120 because a particular cell may be situated such that no subscribers happen to be located within its area.

According to one embodiment, a subscriber 120 is a computer system authorized to access the neighborhood 112 wireless network 100. A subscriber 120 may be situated in a neighborhood home, in a car, or anywhere within the network coverage area. In addition to the mesh network, it is to be appreciated that other systems employing the various teachings herein may also be used to practice the various aspects of the present invention, and as such, are considered to be within its full scope.

Each cell 111 of the hexagonal cells 199 includes a mesh router (such as routers/nodes 101-104) that may either be fixed or mobile. A mesh router 101 communicates with exemplary subscribers 120. The subscribers 120 need to be setup with subscriber accounts in order to gain access to the mesh network, such as mesh network 100, through a mesh router 101. These subscribers 120 may include a wireless personal digital assistant (PDA), a wireless local area network (LAN) router, or a wireless laptop. A wireless PDA may include Palm Pilots with wireless capabilities, Blackberrys, or other hand-held device with wireless capabilities. A wireless router 101 may include any network routers that can communicate with a mesh router 101. A wireless laptop may include any computer system with wireless capabilities. Although a wireless PDA, a wireless LAN router, and a wireless laptop are described, any device with wireless capability may be considered as subscribers.

Mesh routers 101 may also serve as gateways to the Internet. According to one embodiment, mesh router/gateway 101 has at least one network interface, such as an ethernet controller that a connection to the Internet via a communications link, such as Ethernet. In a mesh network, multiple gateways 101 may exist. Gateway 101 allows mesh routers 101 to access the Internet.

The mesh network topology of FIG. 1 may also include a network management server 160. Network management server 160 may be connected to a gateway through the Internet. According to one embodiment, the network management server 160 designates the channel assignments of all mesh routers 101 in the mesh network.

Figure 2:
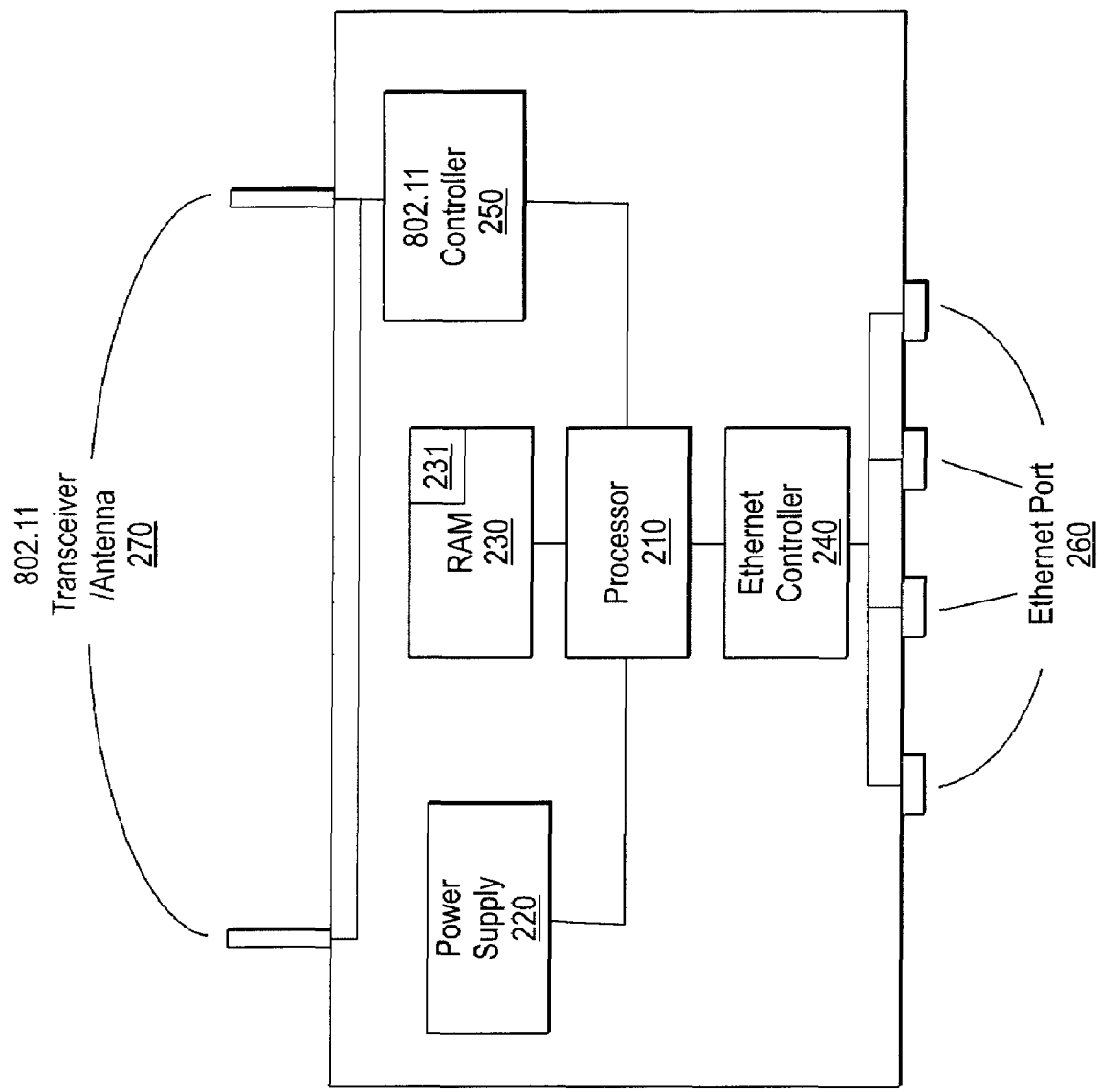
FIG. 2 illustrates a block diagram of an exemplary wireless router, according to one embodiment of the present invention.

FIG. 2 illustrates a block diagram of an exemplary wireless router 200, according to one embodiment of the present invention. In FIG. 2, a wireless router 200 allows subscribers to set up their own local area networks. Wireless router 200 may be a Wi-Fi router such as router 101. The wireless local area network router 200 has a processor 210 connected to the power supply 220, random access memory (RAM) module 230, a Ethernet controller 240, and a 802.11 controller 250. The Ethernet controller 240 allows the processor 210 to communicate with Ethernet adapter 260. The 802.11 controller 250 allows the processor 210 to communicate with the 802.11 antennae 270. RAM module 230 stores a routing table 231 used to route packets to and from router 200.

The present method and system for adaptive wireless routing is based on a user datagram protocol (UDP). Each router (such as routers 101-104, and 200) that uses adaptive wireless routing has a routing process that sends and receives datagrams on a UDP port number (obtained from IETF). All communications intended for another router's adaptive wireless routing process are sent to the adaptive wireless routing port. All routing update messages are sent from the adaptive wireless routing port. There are two distinct adaptive wireless routing packet types: hello and update. Both adaptive wireless routing packet types begin with a standard 4 byte header.

Figure 3:
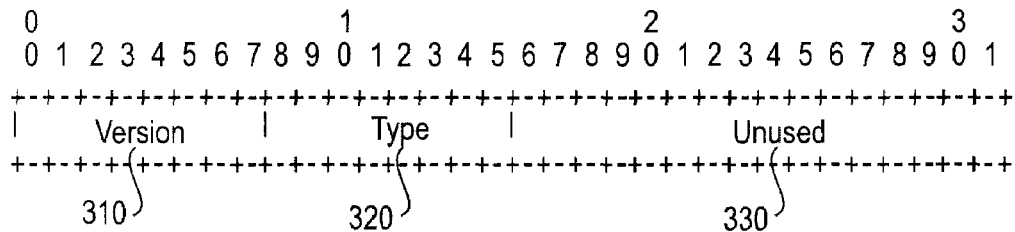
FIG. 3 illustrates a diagram of an exemplary adaptive wireless routing packet that starts with a four byte header, according to one embodiment of the present invention.

FIG. 3 illustrates a diagram of an exemplary adaptive wireless routing packet that starts with a four byte header 300, according to one embodiment of the present invention. Header 300 includes a version section 310 that includes an adaptive wireless routing version number. Type section 320 indicates an adaptive wireless routing packet types: either hello or update. However, additional packet types may be implemented in alternate embodiments. Header 300 also includes an unused section that maybe used for flags, or other information. Although a four byte header 300 is described, a header of other sizes may also be used in alternate embodiments.

Figure 4:
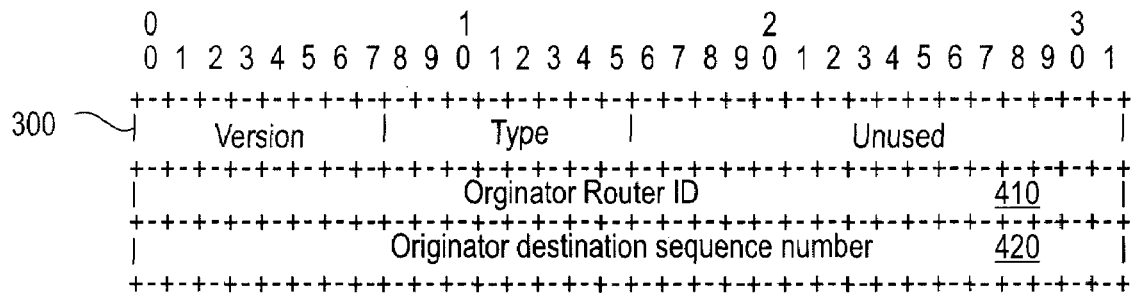
FIG. 4 illustrates a diagram of an adaptive wireless routing hello packet 400, according to one embodiment of the present invention.

FIG. 4 illustrates a diagram of an adaptive wireless routing hello packet 400, according to one embodiment of the present invention. Hello packet 400 is one type of adaptive wireless routing packet type. A hello packet 400 is sent periodically on all adaptive wireless routing interfaces in order to establish and maintain relationships with neighboring nodes. The hello packet 400 includes a header 300, as well as originator router ID 410 and originator destination sequence number 420. Originator router ID 410 is the router ID of the node that originates the hello packet. Destination sequence number 420 is the highest destination sequence number of the node that originates the hello packet. Alternate embodiments are contemplated as hello packet 400 is only one embodiment of a packet for establishing and maintaining neighbor relationships.

Figure 5:
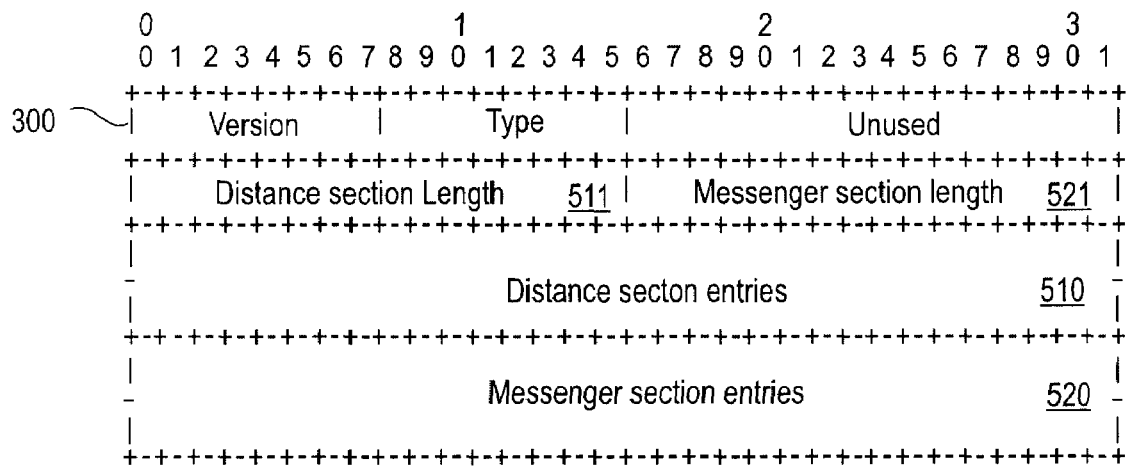
FIG. 5 illustrates a diagram of an adaptive wireless routing update packet, according to one embodiment of the present invention.

FIG. 5 illustrates a diagram of an adaptive wireless routing update packet 500, according to one embodiment of the present invention. An update packet 500 is another type of adaptive wireless routing packet. An update packet 400 is used to maintain the consistency of routing tables in a dynamically varying network (such as network 100), each node (such as router 101) periodically transmits updates, and transmits triggered updates when significant new information is available. According to one embodiment, update packet 500 includes a header 300, as well as a distance section 510 and messenger section 520. A distance section length 511 is provided with a messenger section length 512.

The information contained in the distance section 510 reflects the sender's view of the interconnection topology with other nodes within the network 100. There may be multiple distance section entries in the distance section 510. The number of distance section entries equals to (Distance section length (in bytes)/the length of distance section entry (in bytes)).

FIG. 6 illustrates a diagram of the format of a distance section entry 600, according to one embodiment of the present invention. Distance section entry 600 includes a destination IP address 610, a destination network mask 620, a destination router ID 630, a destination sequence number 640 and a metric 650. The destination IP address 610 could be the router ID of the destination node or the IP network/subnet attached to the destination node. Destination network mask 620 provides the network mask of the destination IP address. According to one embodiment, it is a 32-bit number indicating the range of IP addresses residing on a single IP network/subnet. Destination router ID 630 provides the Router ID of the destination node. Destination sequence number 640 is the destination sequence number. Metric 650 represents the total cost of getting a datagram from the node to that destination. This metric is the sum of the costs associated with the networks that would be traversed to get to the destination.

Returning to FIG. 5, the messenger section 520 contains one or multiple fixed-length messengers that are indexed by a destination router ID. There may be multiple messenger section entries in the messenger section 520. The number of messenger section entries equals to (Messenger section length (in bytes)/the length of messenger section entry (in bytes)). FIG. 7 illustrates a diagram of the format of a messenger section entry 700, according to one embodiment of the present invention. Messenger section entry 700 includes a destination router ID 710, a destination sequence number 720, a next hop value 730 and a metric 750.

Destination router ID field 710 provides the router ID of the destination node. Destination sequence number field 720 provides the destination sequence number. Next hop field 730 is used to indicate who should be interested in this messenger. If the next hop field 730 contains "0xffffffff" (i.e. "255.255.255.255"), the messenger is called a "local broadcast" messenger, and all the nodes that receive this messenger should examine this messenger and act accordingly. Otherwise, the messenger is called a "unicast" messenger, and only the node that has the IP address that matches the IP address contained in the next hop field 730 should examine this messenger and act accordingly. Metric field 740 provides the previous cost (or distance) to the destination known by the node. This is only checked when the next hop field 730 contains "0xffffffff" (i.e. "255.255.255.255").

FIG. 8 illustrates a diagram of an exemplary routing table 800, according to one embodiment of the present invention. Each router that implements adaptive wireless routing (such as router 101 and 200) is assumed to have a routing table 800. Routing table 800 has one entry 890 for every destination that is reachable throughout the system operating with adaptive wireless routing. Each entry 890 contains at least the following information:

The destination IP address 810. This will be referred to as "dst".

The network mask of the destination IP address 820. This will be referred to as "dst_mask".

The Router ID of the destination node 830. This will be referred to as "dst_router_id".

The current highest sequence number route 840. This will be referred to as "hsq_route".

The current least metric route 850. This will be referred to as "lm_route".

A flag to indicate whether an immediate triggered update 860 needs to be issued upon receiving a higher sequence number route (with metric less than infinity) towards this destination. This will be referred to as the "immediate_update_flag".

A flag to indicate whether this route needs to be advertised 870 before the next periodic update. This will be referred to as the "need_advert_flag".

Messenger related information 880.

The present method and system for adaptive wireless routing maintains two routes in its routing entry 890 for each destination that may or may not be the same. One is called the current highest sequence number route 840, and another is called the current least metric route 850. Both are data structures that include the following three items:

The destination sequence number associated with this route. This will be referred to as "seqnum".

The metric, which represents the total cost of getting a datagram from the router to that destination. This will be referred to as "metric".

The next hop, which is the IP address of the next router along the path to the destination. If the destination is on one of the directly-connected networks, this item is not needed. This will be referred to as "next_hop".

According to one embodiment of the present invention, messenger related information 880, includes the following information:

A flag that indicates whether a messenger needs to be sent towards this destination. This will be referred to as "messenger_status_flag".

The destination sequence number of the messenger. This will be referred to as "messenger_dst_seqnum".

The time that last messenger was forwarded towards this destination by this node. This will be referred to as "last_messsenger_time".

A flag indicates whether a local repair should be attempted first if all the routes to this destination are lost. This will be referred to as "local_repairable_flag".

The time since a metric that is smaller than or equal to the metric of the current least metric route is heard. This will be referred to as "local_repairable_time".

A flag indicates whether a local repair process is ongoing. This will be referred to as "local_repair_process_flag".

The time that the last local repair was started. This will be referred to as "local_repair_start_time". This item is checked only when the "local_repair_process_flag" equals to "TRUE".

A flag indicates the status of the local repair process. This will be referred to as "local_repair_state"

Nodes in network 100 establish and maintain neighbor relationships. In adaptive wireless routing, each node keeps track of its continued connectivity to its neighbors. For example in FIG. 1, node 101 keeps track of its connectivity to neighboring node 103. If any suitable MAC layer notification, such as those provided by IEEE 802.11, can be used to detect a broken link, the present method and system for adaptive wireless routing uses the MAC layer feedback combined with layer-3 update packets to determine local connectivity. In one embodiment, no layer-3 hello packets are needed. In one embodiment, each node 101-104 periodically transmits update packets and transmits triggered update packets when significant new information is available on all adaptive wireless routing interfaces. This allows neighbors to be discovered dynamically.

If no suitable MAC layer notification is available, the present method and system for adaptive wireless routing will use layer-3 hello packets combined with layer-3 update packets to determine local connectivity. In this case, periodically (e.g., an interval of every 500 to 1000 milliseconds), the node checks whether it has sent an update packet or a hello packet within the last interval. If it has not, it broadcasts a local hello packet on all adaptive wireless routing interfaces that announce its presence to its neighbors. The link to any known neighbor is assumed to be lost if a node has not received any packets (hello packets or update packets) from that neighbor for more than a set interval (e.g., 3000 milliseconds). When a broken link to a neighbor is detected, the node proceeds as described below.

In one embodiment, update packets 500 are used to transmit routing updates to neighbors. As described by FIG. 5, there may be two sections in update packets 500: distance section 510 and messenger section 520. The information contained in the distance section 510 reflects the sender's view of the interconnection topology with other nodes within the network 100. The Messenger section 520 contains the "messengers" that travel towards the affected destination nodes after link failures in order to locally repair the routes and speed up the convergence.

Figure 9:
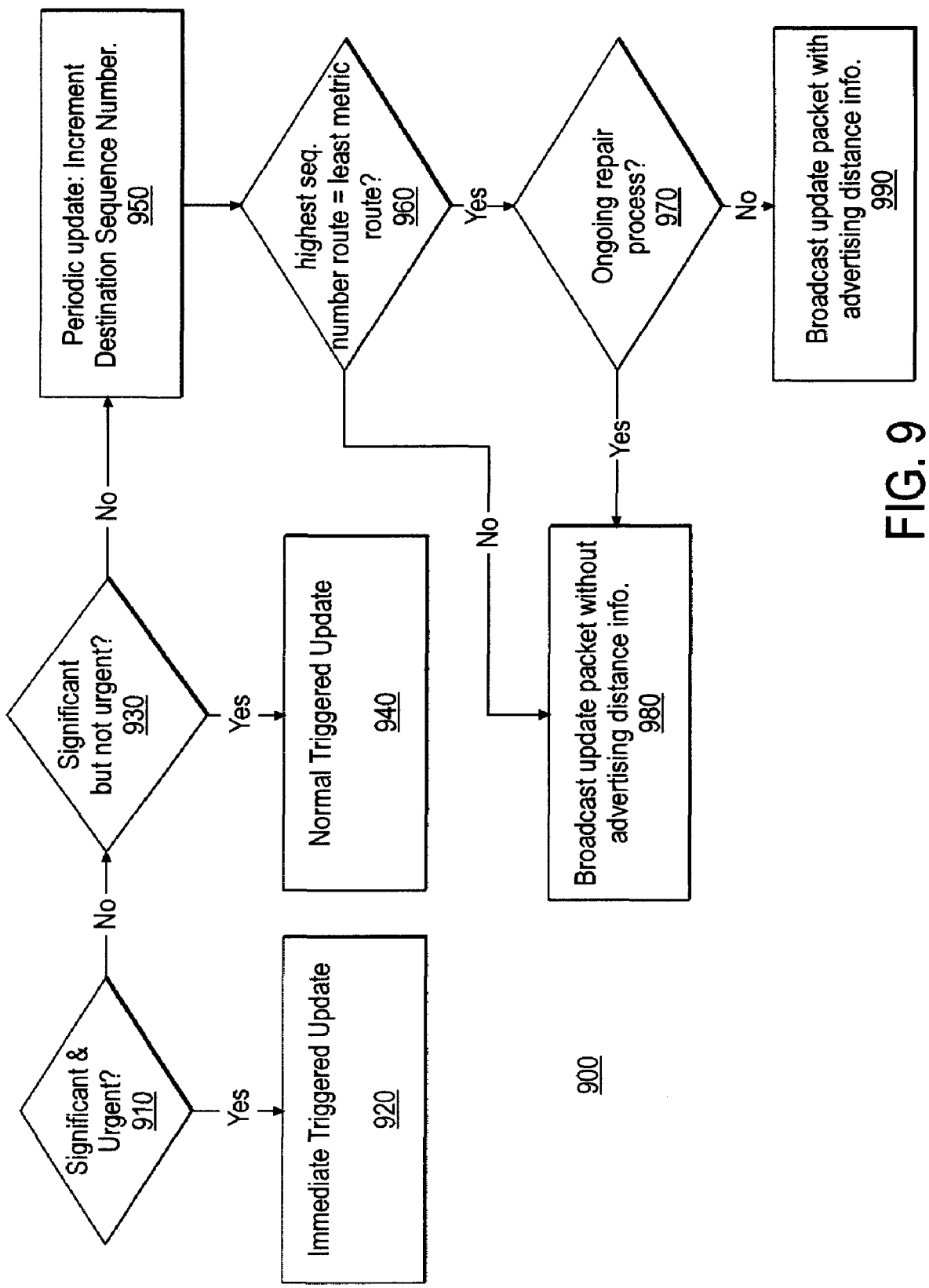
FIG. 9 illustrates a flow diagram of an exemplary process of sending update packets, immediate triggered update packets, and normal triggered update packets, according to one embodiment of the present invention.

According to one embodiment, each node periodically transmits update packets 500 and transmits triggered update packets when significant new information is available. FIG. 9 illustrates a flow diagram of an exemplary process of sending update packets, immediate triggered update packets, and normal triggered update packets, according to one embodiment of the present invention. For example, every 15 to 30 seconds, each node 101-104 increments the destination sequence number (950). The periodic update packet carries all the available routing information that is advertisable. In one embodiment, for each routing entry 890 in the routing table 800, the messenger information, if available, is always advertisable. The distance information, on the other hand, is advertisable only if two conditions are met. Process 900 checks if for a destination, the highest sequence number route is the same as the least metric route (960). If it is not the same, then the periodic update packet is broadcast without advertising distance information. If the routes are the same, process 900 checks if there is an on-going local repair process (the value of local_repair_process_flag equals to FALSE) (970). If there is an on-going local repair process then the periodic update packet is broadcast without advertising distance information. If there is no on-going local repair process then the periodic update packet is broadcast with advertising distance information (990). Nodes 101-103 broadcast (or multicast) a periodic update packet to its neighbors on all its adaptive wireless routing interfaces.

Between periodic updates, triggered update packets are transmitted when significant new information is available. Unlike periodic updates, triggered updates contain only the changed information. In order to reduce the number of triggered update packets and minimize the routing overhead, two types of triggered update are defined: immediate triggered update packets and normal triggered update packets.

The immediate triggered update packet (920) is used when new information that is both significant and urgent becomes available (910). In one embodiment, "significant and urgent routing information" is usually related to re-convergence after topological changes that need to be dealt with immediately. A node uses the immediate triggered update 920 when at least one of the following conditions is met:

- A link breakage is detected AND the link breakage causes the node to lose its routes to at least one known destination.
- Upon receiving an update or hello packet from its neighbor, a node learnt a route (with metric less than infinity) to a brand new node or destination.
- Upon receiving an update packet from its neighbor, a node learnt a higher sequence number route (with metric less than infinity) to a destination AND the immediate update flag of the routing entry associated with the said destination equals to TRUE.
- Upon receiving an update packet from its neighbor, a node receives a higher sequence number route (with metric equals to infinity) that causes the node to lose all its routes to the said destination and/or triggers messenger originating operation.
- Upon receiving an update packet from its neighbor, a node receives a messenger that it can reply directly or forward to its next hop towards the destination of the messenger.
- A local repair timer expires before a new route to the affected destination is found.

To further reduce routing overhead, a minimum time interval between two updates in milliseconds, is defined. When immediate triggered update is used, if the time interval between the current time and the last update is smaller than the minimum time interval, the creation and transmission of the triggered update packet is delayed. The delay may be equal to the minimal time interval minus the difference between the current time and time of last update in milliseconds. Otherwise, a triggered update packet is created and transmitted immediately (920).

If new information that is significant but not urgent becomes available (930), a normal triggered update packet 940 is used. In one embodiment, "significant but not urgent routing information" is usually related to re-convergence after non-topological changes (e.g. destination sequence number and route metric changes). Unlike re-convergence after topological changes that needs to be dealt with immediately, the nodes in the network 100 already have routes and can adapt to the non-topological changes gradually for better routes and at the same time further reduce the routing overhead. After its creation, a normal triggered update event (that triggers a normal trigger update) may be cancelled if any periodic update or immediate triggered update happens before the event times out. Otherwise, the triggered update packet will be created and sent out when this event times out after a normal triggered update time interval.

In one embodiment, each node maintains a destination sequence number for itself, which it increments and includes in its own entry in every periodic update it originates. The node copies the destination sequence numbers for the other entries in periodic and some triggered updates from its routing table. The effect is that the sequence number field in a routing table entry or advertisement entry reflects the age (or the freshness) of that entry's routing information. This helps to identify the stale routes from the new ones, thus avoiding a loop back condition.

With the use of destination sequence numbers, loop-freedom at any instant can be guaranteed if the following route update rules are followed:

A node always prefers routes with higher destination sequence numbers.

Routes are preferred if the sequence number is the same yet the metric is better.

While these rules provide loop-freedom, they also cause route fluctuations under certain circumstances. As the transmissions of routing information by the nodes are asynchronous events, a node could conceivably always receive two routes to the same destination with a newer sequence number one after another (via different neighbors), but always get the route with the worse metric first. Unless care is taken, this will lead to route fluctuations and a continuing burst of new route transmittals upon every new sequence number from that destination. To guarantee loop-freedom at any instant and at the same time avoid unnecessary routing fluctuations, the present method and system maintains two routes in its routing entry for each destination. One route is called the current highest sequence number route (referred to as "hsq_route"), and another route is called the current least metric route (referred to as "lm_route"). Both are data structures that include the following three items:

The destination sequence number (referred to as "seqnum")

The metric (referred to as "metric")

The next hop (referred to as "next_hop")

Figure 10:
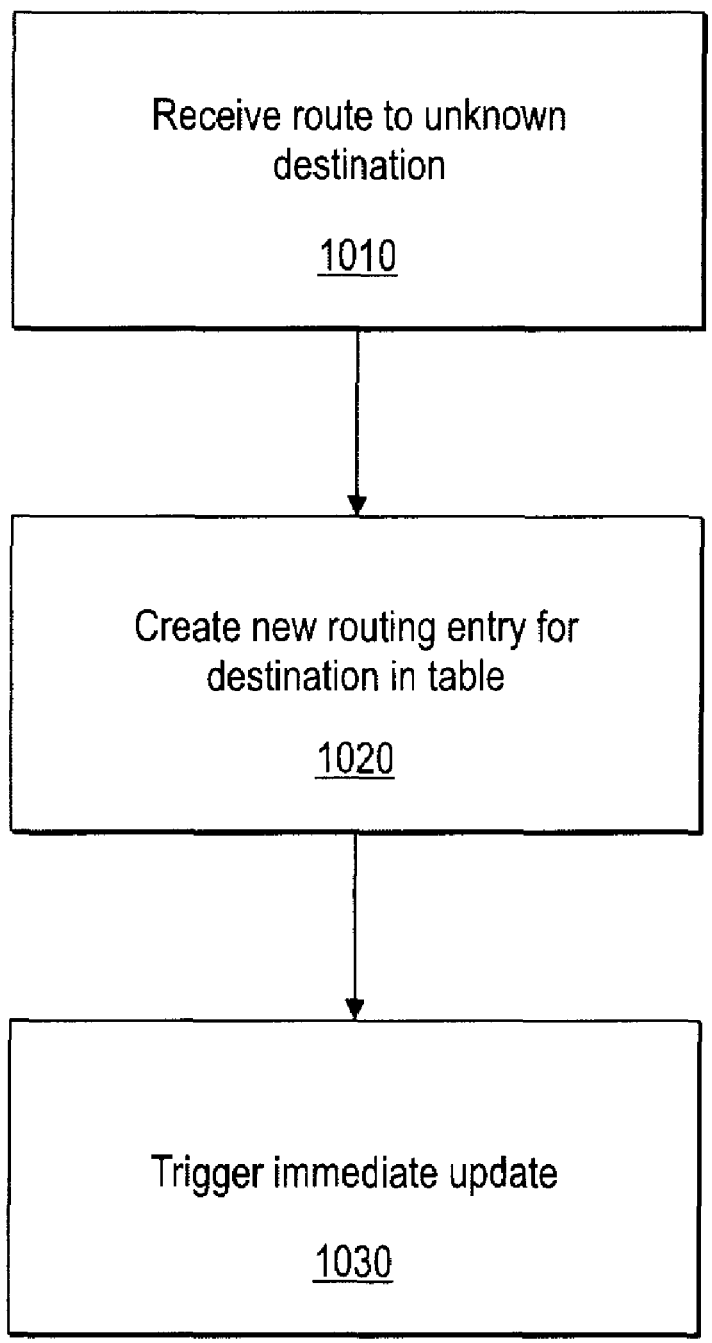
FIG. 10 illustrates a flow diagram of an exemplary process for adding a new routing entry for a newly discovered destination, according to one embodiment of the present invention.

FIG. 10 illustrates a flow diagram of an exemplary process for adding a new routing entry for a newly discovered destination, according to one embodiment of the present invention. A node 101 receives a route (with metric less than infinity) to a previously unknown destination node 104 from a neighbor node 103. (1010) Node 101 creates a new routing entry for destination node 104 in its routing table. (1020) In this new routing entry, hsq_route is set to be the same as lm_route, which means both have the same seqnum, metric and next_hop (which is set to neighbor node 103). Also, an immediate update is triggered. (1030)

Upon receiving a route to a known destination node 104 from a neighbor node 103, the node 101 handles it according to the various routing flags (e.g. immediate_update_flag) in the routing entry for destination node 104 and comparisons among hsq_route, lm_route and the route learnt from neighbor node 103 (referred to as ad_route). According to the update rules, hsq_route and lm_route in the same routing entry may not always be the same, but it is true that:

i) hsq_route.seqnum>=lm_route.seqnum ii) hsq_route.metric>=lm_route.metric

In one embodiment, a default may be set to use only lm_route to forward data when hsq_route is not the same as lm_route for a certain destination. One purpose of maintaining two loop-free routes to the same destination is to avoid unnecessary route fluctuation and prevent nodes from using the bad metric routes. Nevertheless, maintaining two loop-free routes to the same destination does provide an advantage besides avoiding route fluctuation: When lm_route is found broken, if hsq_route still exists with finite metric, the node can just set lm_route to hsq_route internally, and avoid triggering an immediate update that starts a re-convergence involving many nodes potentially.

Another update procedure related to the multiple routes is that the distance information regarding a certain destination is not advertised until hsq_route is the same as lm_route for that destination. While this last procedure is used to guarantee loop-freedom, it can also prevent a node from advertising some of its known routes in a timely manner especially during topological changes if care is not taken. If hsq_route is not the same as lm_route, they will be set to be the same, thus becoming advertisable, when at least one of the following conditions is met:
1) lm_route is found broken.
2) A node receives from its neighbor a route with finite metric and higher destination sequence number than that of existing hsq_route when the value of immediate_update_flag equals to TRUE.
3) A node receives from its neighbor a route with infinity metric and lower destination sequence number than that of existing hsq_route when the metric of hsq_route is not infinity.
4) A node receives from its neighbor a messenger with lower destination sequence number than that of existing hsq_route when the metric of hsq_route is not infinity.
5) Upon receiving an update packet from the neighbor that is the next hop identified in the lm_route, a node finds that the destination sequence number of lm_route would become no smaller than that of hsq_route or the metric of lm_route would become worse than that of hsq_route if the next hop of lm_route is not changed.
6) A node receives from its neighbor a route with higher or equal destination sequence number compared to that of existing hsq_route and a smaller metric than that of lm_route.

The first four conditions above are related to topological changes. As the fast recovery from outage caused by topological changes is deemed much more important than the concern about route fluctuations, the updates that are important to re-convergence caused by topological changes will not be delayed. The last two conditions make sure that the period during which hsq_route is not the same as lm_route is short and transient with or without topological changes. As each node transmits periodic updates and normal triggered updates when it has newer destination sequence numbers to advertise, each node is likely to hear from all its neighbors the route advertisements with the same destination sequence numbers and converge to the right and advertisable routes during a periodic update interval as long as the following two conditions are met:
  i) the update packets are not lost during transmission (the problem of occasional lost update packets is mitigated by the use of periodic updates)
  ii) normal triggered update interval (equals to 2 seconds by default) is much smaller than periodic update interval (equals to 30 seconds by default)

In one embodiment, a messenger concept is introduced to speed up the convergence after link failures. There are two directional "waves" during the fast convergence process using messengers after a link failure. The first wave is the forward wave of the messengers originated by the affected node (or nodes) after the link failure that travel towards the affected destinations. Upon receiving a messenger, an intermediate node will forward it to the next hop identified in its lm_route if certain conditions are met, and at the same time, sets its immediate update flag of the corresponding route entry to TRUE. Once a messenger reaches the destination or a node with higher destination sequence number, an immediate update is triggered. This starts the second wave, the backward wave of triggered updates which carries the fresh routing information, and flows to any nodes that are either directly affected or have forwarded the messengers after the link failure.

In one embodiment, messengers are not independent packets but are embedded inside the messenger section of the update packets. By grouping the messengers that travel towards different destinations and loading them on to the common "ferry ships" (the update packets) used for transmitting routing information to neighbors, adaptive wireless routing takes full advantage of the broadcast nature of the wireless network and minimize the routing overhead.

Each messenger in the messenger section 520 of the update packet 500 contains the following information: destination router ID 710, destination sequence number 720, next hop IP address 730 and estimated metric 740. The destination router ID 710 and the destination sequence number 720 are used to indicate where the messenger is destined for and how fresh its information is. The "next hop" field is used to indicate who should be interested in this messenger. If the next hop field contains "0xffffffff" (i.e. "255.255.255.255"), the messenger is called a "local broadcast" messenger, and all the nodes that receive this messenger must examine the contents of this messenger and act accordingly. Otherwise, the messenger is called a "unicast" messenger, and only the node that has the IP address that matches the IP address contained in the next hop field must examine the contents of this messenger and act accordingly. The estimated metric is the previous metric (i.e. cost or distance) to the destination known by the node. This field is checked only when the next hop field contains "0xffffffff" (i.e. "255.255.255.255").

Figure 11:
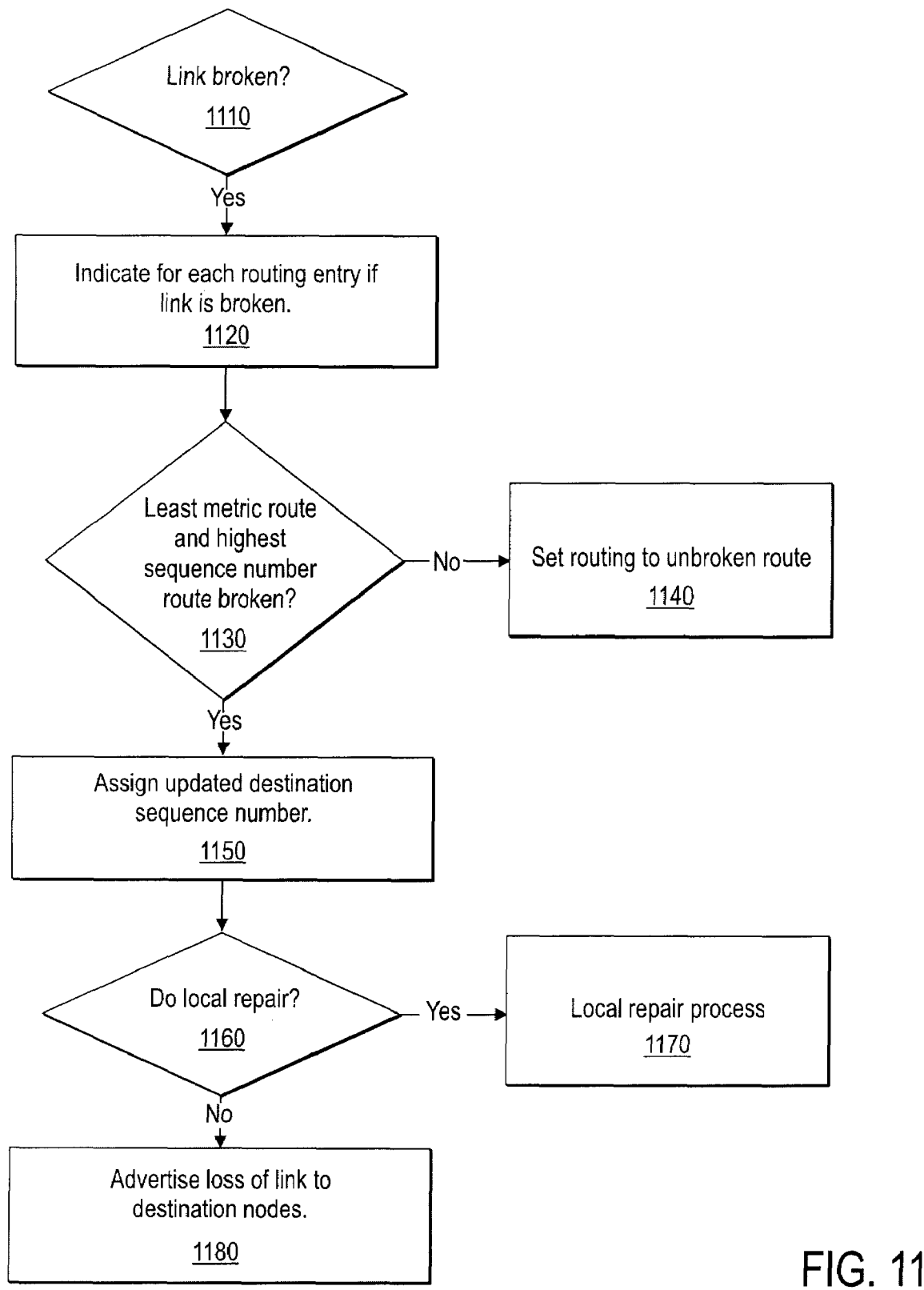
FIG. 11 illustrates a flow diagram of an exemplary process for handling broken links, according to one embodiment of the present invention.

FIG. 11 illustrates a flow diagram of an exemplary process 1100 for handling broken links, according to one embodiment of the present invention. In one embodiment, a broken link is described by a metric of infinity (i.e. any value greater than the maximum allowed metric). When a node 101 detects that its link to a neighbor node 103 has broken (by either layer-2 or layer-3 protocol) (1110), the node 101 checks each routing entry in its routing table and assigns any route that uses neighbor node 103 as next hop a metric of infinity (1120). If the link failure has caused the node 101 to lose only its lm_route or hsq_route but not both for a particular destination node 104 (1130), then it can be dealt with internally (e.g. set lm_route to hsq_route if lm_route is broken but hsq_route is not) (1140) and no immediate update to the outside world is needed because node 101 still has a route to destination node 104. If the link failure has caused the node 101 to lose all its routes to a particular destination node 104 (1130), the node 101 will assign an updated destination sequence number (the current sequence number+1) to its routes to destination node 104 (1150) (building information to describe broken links is the only situation in which the destination sequence number is generated by any nodes other than the destination node). Node 101 decides whether to do a local repair. (1160) If the answer is yes, node 101 starts a local repair process. (1170) Otherwise, node 101 advertises that it has lost all its routes to destination node 104. (1180)

In one embodiment, local repair occurs when a node loses all its routes to a particular destination, instead of advertising that it has lost all its routes to the said destination and potentially disturbing all its upstream nodes, the node may send out a local broadcast messenger towards the said destination for a quick, local recovery if the local repairable flag of the corresponding routing entry equals to TRUE. The logic of maintaining the local repairable flag is summarized as follows. The local repairable flag of a routing entry is initialized as FALSE when the routing entry is initialized. Each time the node hears a route that has a sequence number that is higher or equal to that of the lm_route and a metric that is smaller than or equal to that of lm_route from its neighbors other than its current next hop of lm_route, the local repairable flag is set to TRUE and the local repairable time is set to 0. The local repairable time is increased periodically (e.g. during each periodic update). When local repairable time>=MAX LOCAL REPAIRALE (by default set to 2)*PERIODIC UPDATE INTERVAL, local repairable flag is set to FALSE.

Figure 12:
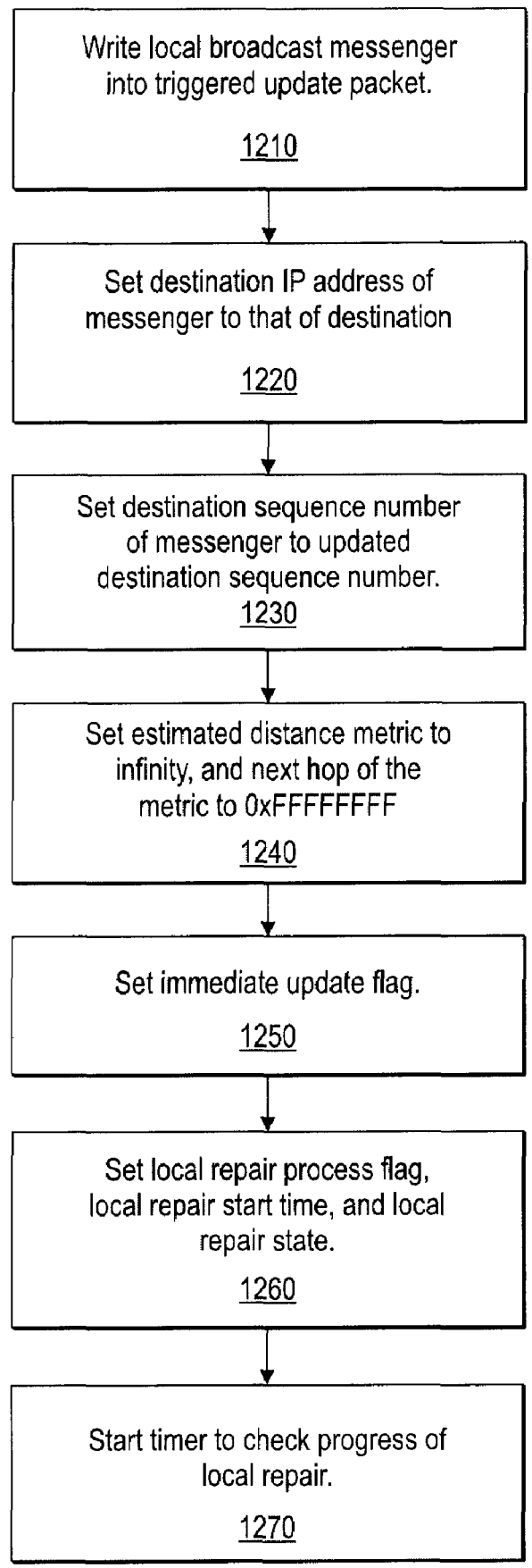
FIG. 12 illustrates an exemplary flow diagram for a local repair process, according to one embodiment of the present invention.
Figure 13:
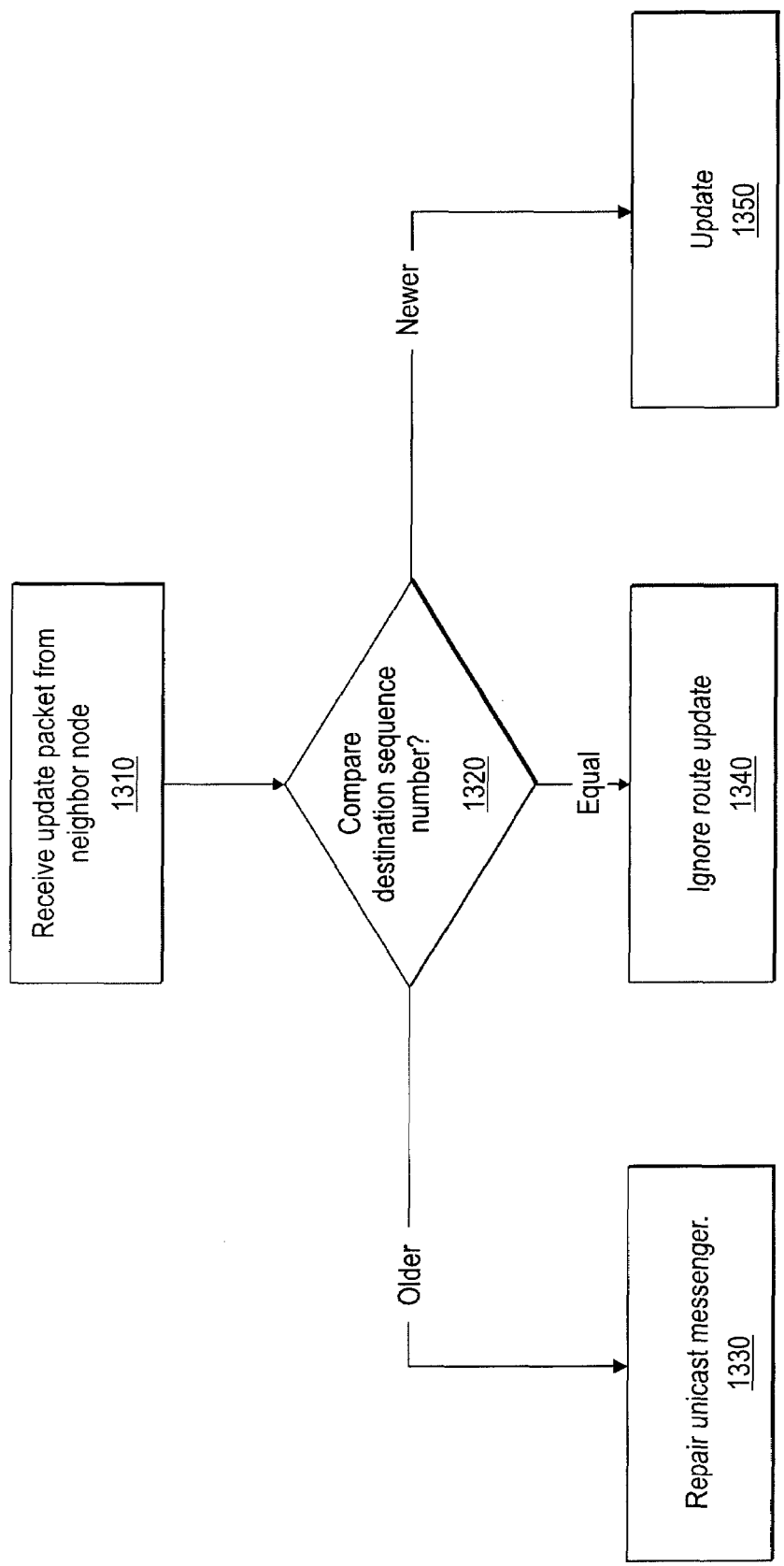
FIG. 13 illustrates a flow diagram for an exemplary process for update packet processing, according to one embodiment of the present invention.
Figure 14:
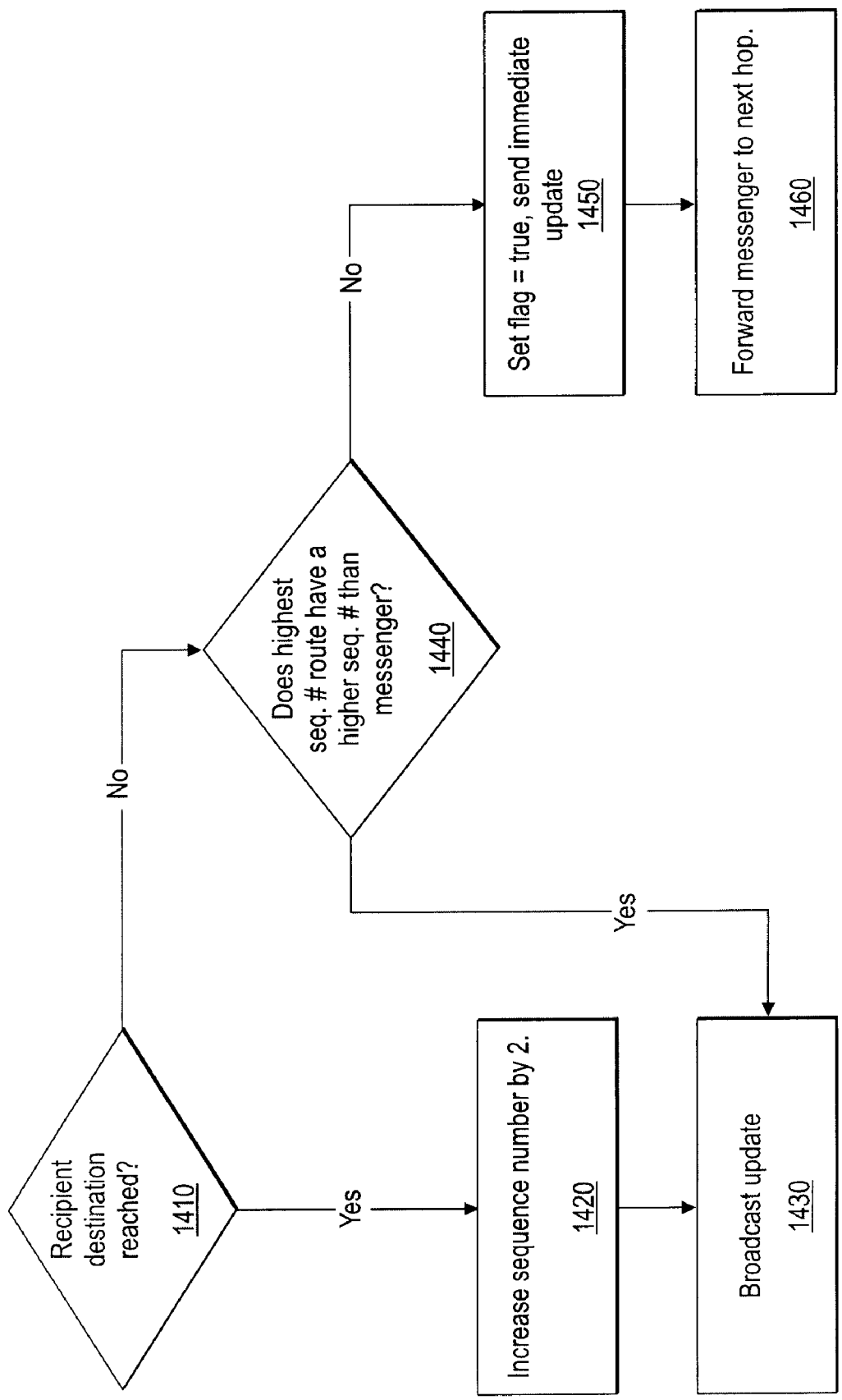
FIG. 14 illustrates a flow diagram of an exemplary process for messenger handling, according to one embodiment of the present invention.

FIG. 12 illustrates an exemplary flow diagram for a local repair process 1200, according to one embodiment of the present invention. When a node 101 has lost all its routes to a particular destination node 104 and its local repairable flag equals to TRUE, node 101 will start a local repair process by writing a local broadcast messenger into the messenger section of its immediately triggered update packet. (1210) The destination IP address of the messenger is set to that of the said destination node 104. (1220) The destination sequence number of the messenger is set to the updated destination sequence number. (1230) The estimated distance metric is set to infinity, and the next hop of the messenger is set to "0xFFFFFFFF". (1240) Node 101 sets an immediate update flag to TRUE (1250), sets a local repair process flag to TRUE, sets a local repair start time to the current time, and sets a local repair state to indicate no response. (1260) Node 101 starts a timer that will call back at a set time to check the progress of the local repair. (1270)

After the node starts the local repair process, it listens to its neighbors. Before the timer times out, if it receives from its neighbor a messenger towards the said destination with estimated metric smaller than or equal to its previous lm_route_.metric, the node sets a local repair state flag to indicate a response was accepted. When the timer times out, if the local repair state flag indicates a response was accepted, node 101 allows the local repair process to proceed. Otherwise, node 101 will give up the local repair by setting the local repair process flag to false and trigger an immediate update to advertise that it has lost all its routes to the destination node 104.

Local repair of link breaks in routes sometimes results in increased path lengths to those destinations. But this is only temporary. The network will converge to the correct shortest paths when the effect of the larger, periodic updates kick in.

When a node 101 has lost all its routes to a particular destination node 104 and its local repairable flag equals to FALSE, the node 101 broadcasts an immediate triggered update packet 500, saying "I lost my route to destination node 104". In one embodiment the update packet 500 includes more than one record in its distance section and may also include a messenger section 520 if some important new routing information regarding the destinations other than destination node 104 has become available since last update. Node 101 sets an immediate update flag of its routing table entry 590 regarding destination node 104 to TRUE. When node 101 learns a new route (a route with a higher destination sequence number) to destination node 104, if the immediate update flag is set to TRUE, node 101 will inform its neighbors immediately.

Upon receiving an update packet (that reports an infinite metric) from node 101, node 101's neighbors will first compare their own destination sequence numbers regarding destination node 104 with the destination sequence number contained in the update packet from node 101. If a neighbor of node 101 has a finite metric and higher destination sequence number than that carried by the update packet, this neighbor of node 101 will set lm_route to hsq_route (if they are not the same already), and send out an immediate triggered update about its route to destination node 104, telling node 101 "you can use me". Node 101 will accept this route, as nodes prefer routes with higher destination sequence numbers, and will use this new route immediately when the immediate update flag equals to TRUE. If a neighbor of node 101's has the destination sequence number equal to that carried by the messenger, the neighbor will ignore this route unless node 101 is its next hop in its lm_route and its hsq_route is not the same as its lm_route. If a neighbor of node 101's has a destination sequence number lower than that carried by the update packet, there will be two cases:
1) If this neighbor uses node 101 as its current next hop in its lm_route, and its hsq_route is either the same as its lm_route or has a metric of infinity, then this neighbor will decide whether to start a local repair process or advertise that "I lost my route to destination node 104, too" according to the value of the local repairable flag and act accordingly.
2) Otherwise, this neighbor will send a unicast messenger along the direction of its lm_route regarding destination node 104 as it thinks it still has at least one route to destination node 104.

In either case, this neighbor of node 101 takes note when it receives the "I-lost-my-route-to-destination node 104" update packet from node 101 by setting its immediate update flag to TRUE. It will inform node 101 immediately when it learns a new route (a route with a higher destination sequence number and finite metric) to destination node 104.

Upon receiving a messenger, an immediate node first checks if it itself is the destination for the messenger. If it is, the node will increase its sequence number by 2 if its existing sequence number is no bigger than that carried by the messenger, and then broadcasts an immediate routing update about itself. If the node is not the destination, the node will check if its hsq_route has a finite metric and higher destination sequence number than that of the messenger. If it does, the node will set lm_route to hsq_route and broadcast an immediate update about its fresher route to destination node 104. If it doesn't, the node will set its immediate update flag to TRUE, and "forward" the messenger to the next hop of its lm_route towards destination node 104 if the following two conditions are met:
 i) The node thinks it still has a route (with finite metric) to destination node 104.
 ii) The messenger is a local broadcast messenger or if the messenger is a unicast messenger, the node is the node that is identified in the "next hop" field of the messenger.

If at least one of the two conditions is not met, the messenger is "dropped".

Three factors greatly contribute to the efficiency and scalability of this approach:
1) Regarding route recovery after link failures, the directional wave method is much more efficient than prior art flooding methods. Because the messengers take advantage of the routes discovered and maintained by the underlying proactive routing protocol, and follow only towards the destination, they incur a lot less routing overhead than a "flood", which goes towards all directions and can potentially affect the whole network.
2) Convergence is relatively local. The routes are locally patched with bigger updates at a slower pace. In one embodiment, after a link breakage, only the nodes that are directly affected and the nodes on the paths of the messengers to the destination will do the immediate updates, all the other nodes will ignore it or update their neighbors at a much slower pace. The local repair method further localizes the convergence and reduces the routing overhead.
3) Routing load is further reduced, and scalability is greatly improved by grouping the messengers that travel towards different directions into the update packets, the common vehicles for transmitting the routing information.

Suppose there are two paths from mobile node 101 to destination mobile node 104. One path has hop count of 3 and is usable 99% of the time. Another has hop count of 2 and is usable only 20% of the time. If hop count is used as the metric, all the traffic will be routed to the second path because it has smaller hop count. But in reality, the first path is much better in terms of reliability and performance (i.e. throughput), and thus much gentler to applications. From this simple example, it is evident that path quality and path capacity should also be taken into account when selecting routes. In an embodiment, one way to do this is to use the following combinational metric:

$$\text{metric}(u,v) = C1/\text{link-quality}(u,v) + C2/\text{link-capacity}(u,v) + C3*1 \qquad (1)$$

Where metric(u,v) is the link metric for the wireless link between node u and v, link-quality (u,v) indicates quality (or robustness) of the link, and link-capacity(u,v) indicates the available bandwidth of the link. Also, in (1), C1, C2, C3 are constants that can be used to adjust the weight of each factor.

In situations where the confidentiality of the network topology is of importance, regular cryptographic techniques such as exchange of adaptive wireless routing control traffic messages encrypted by PGP or encrypted by some shared secret key can be applied to ensure that control traffic can be read and interpreted by only those authorized to do so. Message authentication is also used to prevent malicious or malfunctioning nodes from injecting invalid control traffic and compromising the network integrity.

A method and system for an adaptive wireless routing protocol in a mesh network. have been disclosed. Although the present methods and systems have been described with respect to specific examples and subsystems, it will be apparent to those of ordinary skill in the art that it is not limited to these specific examples or subsystems but extends to other embodiments as well.

I claim:

1. A method, comprising:
   routing datagrams between a plurality of nodes in a mesh network;
   receiving a routing packet that contains distance information and messenger information associated with a destination node of the plurality of nodes;
   routing the routing packet to one or more of the plurality of nodes;
   maintaining a highest sequence number route and a least metric route to the destination node of the plurality of nodes using the distance information and the messenger information contained in the routing packet, wherein the highest sequence number route is a freshest route to the destination node and the least metric route is a least cost route to the destination node; and
   updating a routing path to the destination node using the highest sequence number route and the least metric route.

2. The method of claim 1, wherein the routing packet establishes and maintains neighbor relationships.

3. The method of claim 1 further comprising maintaining routing tables in each node of the plurality of nodes.

4. The method of claim 3, wherein the routing tables include a destination IP address, a destination mark, a router ID, a highest sequence number route, a least metric route, an immediate update flag, and messenger information.

5. The method of claim 2, wherein the routing packet is a hello packet, a periodic update packet, an immediate trigger update packet, or a normal triggered update packet.

6. The method of claim 1, wherein routing datagrams comprises choosing the highest destination sequence number route.

7. The method of claim 1, further comprising monitoring if links with one or more neighbor nodes are broken.

8. The method of claim 7, further comprising performing a local repair procedure when links to the destination node are broken.

9. A computer-readable medium having stored thereon a plurality of instructions, said plurality of instructions when executed by a computer, cause said computer to perform:
   routing datagrams between a plurality of nodes in a mesh network;
   receiving a routing packet that contains distance information and messenger information associated with a destination node of the plurality of nodes;
   routing the routing packet to one or more of the plurality of nodes;
   maintaining a highest sequence number route and a least metric route to the destination node of the plurality of nodes using the distance information and the messenger information contained in the routing packet, wherein the highest sequence number route is a freshest route to the destination node and the least metric route is a least cost route to the destination node; and
   updating a routing path to the destination node using the highest sequence number route and the least metric route.

10. The computer-readable medium of claim 9, wherein the routing packet establishes and maintains neighbor relationships.

11. The computer-readable medium of claim 9, having stored thereon-additional instructions, said additional instructions when executed by a computer for routing datagrams, cause said computer to further perform maintaining routing tables in each node of the plurality of nodes.

12. The computer-readable medium of claim 11, wherein the routing tables include a destination IP address, a destination mark, a router ID, a highest sequence number route, a least metric route, an immediate update flag, and messenger information.

13. The computer-readable medium of claim 10, wherein the routing packet is a hello packet, a periodic update packet, an immediate trigger update packet, or a normal triggered update packet.

14. The computer-readable medium of claim 9, having stored thereon-additional instructions, said additional instructions when executed by a computer for routing datagrams, cause said computer to further perform choosing the highest destination sequence number route.

15. The computer-readable medium of claim 9, having stored thereon-additional instructions, said additional instructions when executed by a computer, cause said computer to further perform monitoring if links with one or more neighbor nodes are broken.

16. The computer-readable medium of claim 10 having stored thereon-additional instructions, said additional instructions when executed by a computer, cause said computer to further perform performing a local repair procedure when links to the destination node are broken.

17. A mesh router, comprising:
   a processor;
   memory coupled to the processor; and
   a bus coupling the processor and memory;
   wherein the memory stores instructions that are executed by the processor to route datagrams between a plurality of nodes in a mesh network; to receive a routing packet that contains distance information and messenger information associated with a destination node of the plurality of nodes; to route the routing packet to one or more of the plurality of nodes; to maintain a highest sequence number route and a least metric route to the destination node of the plurality of nodes using the distance information and the messenger information contained in the routing packet, wherein the highest sequence number route is a freshest route to the destination node and the least metric route is a least cost route to the destination node; and to update a routing path to the destination node using the highest sequence number route and the least metric route.

18. The router of claim 17, wherein the routing packet establishes and maintains neighbor relationships.

19. The router of claim 17, wherein routing tables are stored in the memory.

20. The router of claim 19, wherein the routing tables include a destination IP address, a destination mark, a router ID, a highest sequence number route, a least metric route, an immediate update flag, and messenger information.

21. The method of claim 18, wherein the routing packet is a hello packet, a periodic update packet, an immediate trigger update packet, or a normal triggered update packet.

22. The method of claim 17, wherein the routing path is the highest destination sequence number route.

23. The method of claim 17, further comprising monitoring if links with one or more neighbor nodes are broken.

24. The method of claim 23, further comprising performing a local repair procedure when links to the destination node are broken.

* * * * *

UNITED STATES PATENT AND TRADEMARK OFFICE
CERTIFICATE OF CORRECTION

PATENT NO. : 7,668,173 B2 Page 1 of 1
APPLICATION NO. : 11/291747
DATED : February 23, 2010
INVENTOR(S) : Fuyong Zhao It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 973 days.

Signed and Sealed this

Seventh Day of December, 2010

David J. Kappos
*Director of the United States Patent and Trademark Office*